United States Patent

Jin et al.

(10) Patent No.: US 10,487,247 B2
(45) Date of Patent: Nov. 26, 2019

(54) ADHESIVE COMPOSITION

(71) Applicant: Dow Global Technologies LLC, Midland, MI (US)

(72) Inventors: Yi Jin, Freeport, TX (US); Selim Yalvac, Freeport, TX (US); Jozef Van Dun, Horgen (CH); Gary R. Marchand, Freeport, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/761,349

(22) PCT Filed: Sep. 22, 2016

(86) PCT No.: PCT/US2016/053040
§ 371 (c)(1),
(2) Date: Mar. 19, 2018

(87) PCT Pub. No.: WO2017/058627
PCT Pub. Date: Apr. 6, 2017

(65) Prior Publication Data
US 2018/0265753 A1    Sep. 20, 2018

Related U.S. Application Data

(60) Provisional application No. 62/235,185, filed on Sep. 30, 2015.

(51) Int. Cl.
*C09J 123/14* (2006.01)
*C08L 23/14* (2006.01)
*C08L 23/08* (2006.01)
*C08L 51/06* (2006.01)

(52) U.S. Cl.
CPC ....... *C09J 123/142* (2013.01); *C08L 23/0815* (2013.01); *C08L 23/142* (2013.01); *C08L 51/06* (2013.01)

(58) Field of Classification Search
CPC ..... C08L 23/142; C08L 23/0815; C08L 51/06
See application file for complete search history.

(56) References Cited

U.S. PATENT DOCUMENTS

| 7,378,481 | B1  | 5/2008  | Gong et al. |
| 8,431,642 | B2  | 4/2013  | Tancrede et al. |
| 8,431,643 | B2  | 4/2013  | Rodriguez et al. |
| 9,109,143 | B2  | 8/2015  | Tse et al. |
| 9,505,957 | B2  | 11/2016 | Schroeyers et al. |
| 9,605,186 | B2  | 3/2017  | Tse |
| 2006/0014901 | A1* | 1/2006 | Hassan ............. C09J 123/0815 525/191 |
| 2010/0160497 | A1 | 6/2010 | Karjala et al. |
| 2013/0060215 | A1 | 3/2013 | Knutson et al. |
| 2015/0087760 | A1 | 3/2015 | Kanderski et al. |
| 2015/0361315 | A1 | 12/2015 | Karjala et al. |
| 2016/0312088 | A1 | 10/2016 | Brown et al. |

FOREIGN PATENT DOCUMENTS

WO    WO-2006069205 A1 *  6/2006  ............. C08F 10/00

OTHER PUBLICATIONS

Th. G. Scholte et al., Journal of Applied Polymer Science, vol. 29, 3763-3782 (1984).
E.P. Otocka et al., Macromolecules, vol. 4, No. 4, Jul.-Aug. 1971, 507-514.

* cited by examiner

*Primary Examiner* — Mark S Kaucher
(74) *Attorney, Agent, or Firm* — Quarles & Brady LLP

(57) ABSTRACT

The present disclosure provides a composition. In an embodiment a composition is provided and includes: (A) a carboxylic-functionalized ethylene/a-olefin interpolymer having (i) a density from 0.855 g/cc to 0.895 g/cc; and (ii) a melt viscosity, at 177° C., less than, or equal to, 50,000 mPa·s; and (B) a propylene-based interpolymer having (i) a density from 0.870 g/cc to 0.890 g/cc; and (ii) a melt viscosity, at 177° C., less than, or equal to, 50,000 mPa·s.

20 Claims, No Drawings

ADHESIVE COMPOSITION

REFERENCE TO RELATED APPLICATIONS

This application claims the benefit of U.S. Provisional Application No. 62/235,185, filed Sep. 30, 2015, and incorporated herein by reference.

BACKGROUND

Compositions for conventional hot-melt adhesive (HMA) formulations typically follow a general rule of thumb of containing ⅓ polymer, ⅓ tackifier and ⅓ wax. Due to the short supply and increasing cost of tackifier, market demand is growing for HMA formulations containing greater polymer content and less tackifier. However, reducing the amount of tackifier and increasing the amount of polymer has the drawback of deteriorated adhesion and increasing the set time of the HMA composition when using traditional polymers such as ethylene vinyl acetate (EVA) and ethylene-based copolymers. An HMA formulation using propylene/ethylene copolymer having a high melt flow rate can be formulated into an HMA formulation with a higher polymer content and sufficient adhesion performance, but due to propylene-based copolymer's inherently slow crystallization time, set time of the HMA formulation is slower than compositions containing ethylene-based copolymers. A need exists for a HMA composition with reduced tackifier, while maintaining suitable adhesion properties and a rapid set time compatible with high-speed line processing applications.

A need further exists for a HMA composition with a propylene-based polymer having improved high temperature resistance, improved adhesion properties, improved substrate compatibility, and/or improved thermal stability.

SUMMARY

The instant disclosure provides a composition suitable for adhesive applications, and further for holt-melt adhesive applications. The present disclosure provides a composition. In an embodiment, a composition is provided and includes:

(A) a carboxylic-functionalized ethylene/α-olefin interpolymer having (i) a density from 0.855 g/cc to 0.895 g/cc; and (ii) a melt viscosity, at 177° C., less than, or equal to, 50,000 mPa·s; and (B) a propylene based interpolymer having (i) a density from 0.870 g/cc to 0.890 g/cc; and (ii) a melt viscosity, at 177° C., less than, or equal to, 50,000 mPa·s.

Definitions

Any reference to the Periodic Table of Elements is that as published by CRC Press, Inc., 1990-1991. Reference to a group of elements in this table is by the new notation for numbering groups. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art. The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

An "olefin-based polymer" or "polyolefin" is a polymer that contains a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer. An "ethylene-based polymer" or "ethylene polymer" is a polymer that contains a majority amount of polymerized ethylene based on the weight of the polymer, and, optionally, may comprise at least one comonomer. A "propylene-based polymer" is a polymer that contains a majority amount of polymerized propylene based on the weight of the polymer, and, optionally, may comprise at least one comonomer. A "propylene-based interpolymer" is an interpolymer that contains, in polymerized form, a majority amount of propylene, based on the weight of the interpolymer, and at least one comonomer.

An "ethylene/α-olefin interpolymer" is an interpolymer that contains a majority amount of polymerized ethylene, based on the weight of the interpolymer, and at least one α-olefin. An "ethylene/α-olefin copolymer" is an interpolymer that contains a majority amount of polymerized ethylene, based on the weight of the copolymer, and an α-olefin, as the only two monomer types.

A "propylene/α-olefin interpolymer" is an interpolymer that contains, in polymerized form, a majority amount of propylene, based on the weight of the interpolymer, and at least one α-olefin. A "propylene/α-olefin copolymer" is a copolymer that contains, in polymerized form, a majority amount of propylene, based on the weight of the copolymer, and an α-olefin, as the only two monomer types.

A "propylene/ethylene interpolymer" is an interpolymer that contains, in polymerized form, a majority amount of propylene, based on the weight of the interpolymer, and at least ethylene. A "propylene/ethylene copolymer" is a copolymer that contains, in polymerized form, a majority amount of propylene, based on the weight of the copolymer, and ethylene, as the only two monomer types.

DETAILED DESCRIPTION

The instant disclosure provides a composition suitable for holt-melt adhesive applications. The composition includes: (A) a carboxylic-functionalized ethylene/α-olefin interpolymer; and (B) a propylene-based interpolymer (for example, a propylene-based plastomer or elastomer (PBPE)).

In an embodiment, the present composition includes: (A) a carboxylic-functionalized ethylene/α-olefin interpolymer; and (B) a propylene-based interpolymer (for example, a propylene-based plastomer or elastomer (PBPE)); (C) optionally, an ethylene-based polymer; and/or (D) optionally, a tackifier.

The composition may comprise two or more embodiments discussed herein.

In an embodiment the composition is an adhesive composition, and further a hot melt adhesive (HMA) composition. Although the following disclosure is directed to HMA compositions, it is understood that the following disclosure is applicable to other adhesive compositions, such as pressure sensitive adhesive compositions, for example.

A. Carboxylic-functionalized Ethylene/α-Olefin Interpolymer

The present composition includes a carboxylic-functionalized ethylene/α-olefin interpolymer. A "carboxylic-functionalized ethylene/α-olefin interpolymer," as used herein, is an ethylene/α-olefin interpolymer with a carboxylic acid-based moiety bonded to the ethylene/α-olefin interpolymer chain (for example, a carboxylic acid-based moiety grafted to the ethylene/α-olefin interpolymer chain). A "carboxylic acid-based moiety" is a compound that contains a carboxyl group (—COOH) or a derivative thereof. Nonlimiting examples of suitable carboxylic acid-based moieties include carboxylic acids and carboxylic acid anhydrides. Nonlimiting examples of suitable carboxylic acids and carboxylic acid anhydrides that can be grafted onto the ethylene/α-olefin interpolymer include maleic acid, fumaric acid, itaconic acid, acrylic acid, methacrylic acid, crotonic acid, maleic anhydride, and itaconic anhydride.

In an embodiment, the carboxylic-functionalized ethylene/α-olefin interpolymer is a maleic-anhydride-functionalized ethylene/α-olefin interpolymer.

In an embodiment, the carboxylic-functionalized ethylene/α-olefin interpolymer is a maleic-anhydride-grafted ethylene/α-olefin interpolymer ("MAH-g-ethylene/α-olefin interpolymer"). Nonlimiting examples of suitable MAH-g-ethylene/α-olefin interpolymers include MAH-g-ethylene/α-olefin copolymers (for example, AFFINITY™ GA 1000R and AMPLIFY™ GR 216, available from The Dow Chemical Company).

In an embodiment, the carboxylic-functionalized ethylene/α-olefin interpolymer is a carboxylic-acid-functionalized ethylene/α-olefin interpolymer. In an embodiment, the carboxylic-functionalized ethylene/α-olefin interpolymer is a carboxylic-acid-grafted ethylene/α-olefin interpolymer.

The ethylene/α-olefin interpolymer of the carboxylic-functionalized ethylene/α-olefin interpolymer is an ethylene-based interpolymer containing a majority amount of polymerized ethylene, based on the weight of the carboxylic-functionalized ethylene/α-olefin interpolymer. In an embodiment, the carboxylic-functionalized ethylene/α-olefin interpolymer contains greater than 50 wt % units derived from ethylene, or from 51 wt %, or 55 wt %, or 60 wt %, or 65 wt % to 70 wt %, or 75 wt %, or 80 wt %, or 85 wt %, or 90 wt %, or 95 wt %, or 98 wt %, or 99 wt % units derived from ethylene, based on the weight of the carboxylic-functionalized ethylene/α-olefin interpolymer. Representative α-olefins include, but are not limited to, $C_3$-$C_{20}$ α-olefins, or $C_3$-$C_{10}$ α-olefins, or $C_4$-$C_{20}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene, and preferably 1-butene, 1-hexene and 1-octene. In an embodiment, the carboxylic-functionalized ethylene/α-olefin interpolymer does not contain an aromatic comonomer polymerized therein. In an embodiment, the carboxylic-functionalized ethylene/α-olefin interpolymer is a carboxylic-functionalized ethylene/α-olefin copolymer. In an embodiment, the carboxylic-functionalized ethylene/α-olefin interpolymer is a MAH-g-ethylene/octene copolymer.

In an embodiment, the carboxylic-functionalized ethylene/α-olefin interpolymer contains from greater than 0 wt %, 0.01 wt %, 0.02 wt %, 0.03 wt %, 0.04 wt % or 0.05 wt %, 0.06 wt %, 0.07 wt %, 0.08 wt %, 0.09 wt %, 0.1 wt %, 0.2 wt %, 0.5 wt % or 1 wt % to 1.5 wt %, 2 wt %, 3 wt %, 5 wt %, 10 wt %, 15 wt % or 20 wt % of the carboxylic acid-based moiety, based on the weight of the carboxylic-functionalized ethylene/α-olefin interpolymer. In an embodiment, the carboxylic-functionalized ethylene/α-olefin interpolymer contains from greater than 0 wt % to less than 1.5 wt % of the carboxylic acid-based moiety, based on the weight of the carboxylic-functionalized ethylene/α-olefin interpolymer.

In an embodiment, the carboxylic-functionalized ethylene/α-olefin interpolymer has a density of from 0.855 g/cc, or 0.860 g/cc, or 0.865 g/cc, or 0.870 g/cc to 0.875 g/cc, or 0.880 g/cc, or 0.885 g/cc, or 0.890 g/cc, or 0.895 g/cc. If the density of the carboxylic-functionalized ethylene/α-olefin interpolymer is greater than 0.895 g/cc, the flexibility of the composition is adversely affected.

In an embodiment, the carboxylic-functionalized ethylene/α-olefin interpolymer has a melt viscosity, at 177° C., from 2,000 milliPascal-second (mPa·s), or 2,500 mPa·s, or 3,000 mPa·s, or 4,000 mPa·s, or 4,500 mPa·s, or 5,000 mPa·s, or 6,000 mPa·s, or 7,000 mPa·s, or 8,000 mPa·s, 9,000 mPa·s, or 10,000 mPa·s, or 15,000 mPa·s to 20,000 mPa·s, or 25,000 mPa·s, or 30,000 mPa·s, 35,000 mPa·s, or 40,000 mPa·s, or 45,000 mPa·s, or 48,000 mPa·s, or 50,000 mPa·s.

In an embodiment, the carboxylic-functionalized ethylene/α-olefin interpolymer has a melting point ($T_m$) from 25° C., 30° C., 40° C., 50° C., 60° C. or 65° C. to 70° C., 80° C., 90° C., 100° C., 110° C., 120° C., 130° C. or 140° C. In a further embodiment, the carboxylic-functionalized ethylene/α-olefin interpolymer has a melting point ($T_m$) of from 50° C. to 90° C.

In an embodiment, the carboxylic-functionalized ethylene/α-olefin interpolymer has a glass transition temperature ($T_g$) of from −80° C., −70° C., −60° C., −58° C. or −56° C. to −54° C., −52° C., −50° C., −40° C., −30° C. or −20° C. In a further embodiment, the carboxylic-functionalized ethylene/α-olefin interpolymer has a glass transition temperature ($T_g$) of from −58° C. to −40° C.

In an embodiment, the carboxylic-functionalized ethylene/α-olefin interpolymer has one, some, or all of the following properties: (i) at least 50 wt % units derived from ethylene; (ii) from greater than 0 wt % to 20 wt % of the carboxylic acid-based moiety; (iii) a density from 0.855 g/cc to 0.895 g/cc; (iv) a melt viscosity at 177° C. from 2,000 mPa·s to 50,000 mPa·s; (v) a melting point ($T_m$) from 25° C. to 140° C.; and/or (vi) a glass transition temperature ($T_g$) from −80° C. to −20° C.

In an embodiment, the carboxylic-functionalized ethylene/α-olefin interpolymer is a maleic-anhydride-grafted ethylene/α-olefin interpolymer and has one, some, or all of the following properties: (i) at least 50 wt % units derived from ethylene; (ii) from greater than 0 wt % to 3 wt % of the maleic-anhydride-based moiety; (iii) a density from 0.865 g/cc to 0.885 g/cc; (iv) a melt viscosity at 177° C. from 5,000 mPa·s to 50,000 mPa·s; (v) a melting point ($T_m$) from 50° C. to 80° C.; and/or (vi) a glass transition temperature ($T_g$) from −70° C. to −50° C.

In an embodiment, the carboxylic-functionalized ethylene/α-olefin interpolymer is present in the composition in an amount from 1 wt %, or 2 wt %, or 3 wt %, or 4 wt %, or 5 wt % to 6 wt %, or 7 wt %, or 8 wt %, or 9 wt %, or 10 wt %, based on total weight of the composition.

The present carboxylic-functionalized ethylene/α-olefin interpolymer may comprise two or more embodiments discussed herein.

B. Propylene-based Interpolymer

The present adhesive composition includes a propylene-based interpolymer.

In an embodiment, the propylene-based interpolymer is selected from a propylene/α-olefin interpolymer, or a propylene/α-olefin copolymer. Nonlimiting examples of suitable α-olefins include, for example, $C_4$, $C_5$, $C_6$ and $C_8$ α-olefins.

In an embodiment, the propylene-based interpolymer is selected from a propylene/ethylene interpolymer, or a propylene/ethylene copolymer.

In an embodiment, the propylene-based interpolymer is a propylene-based plastomer or elastomer.

In an embodiment, the propylene-based interpolymer contains greater than 50 wt % units derived from propylene, or from 51 wt %, or 55 wt %, or 60 wt %, or 65 wt % to 70 wt %, or 75 wt %, or 80 wt %, or 85 wt %, or 90 wt %, or 95 wt %, or 98 wt %, or 99 wt % units derived from propylene, based on the weight of the propylene-based interpolymer.

In an embodiment, the propylene-based interpolymer has a total unsaturation per mole of propylene from 0.01%, or 0.015% to 0.025%, or 0.03%. The total unsaturation per mole of propylene is measured by $^1$H NMR analysis, as described below in the test methods section. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a melt viscosity, at 177° C., from 500 mPa·s, or 750 mPa·s, or 1,000 mPa·s, or 2,000 mPa·s, or 3,000 mPa·s, or 5,000 mPa·s, or 8,000 mPa·s, or 9,000 mPa·s, or 10,000 mPa·s to 11,000 mPa·s, or 12,000 mPa·s, or 15,000 mPa·s, or 18,000 mPa·s, or 20,000 mPa·s, or 25,000 mPa·s, or 30,000 mPa·s, or 35,000 mPa·s, or 40,000 mPa·s, or 45,000 mPa·s, or 50,000 mPa·s. In an embodiment, the propylene-based interpolymer has a melt viscosity, at 177° C., from 800 mPa·s to 11,000 mPa·s. In another embodiment, the propylene-based interpolymer has a melt viscosity, at 177° C., from 500 mPa·s to less than, or equal to, 50,000 mPa·s. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a branching index (g') from 0.95, or 0.99 to 1.0, or 1.01, or 1.05. In an embodiment, the propylene-based interpolymer has a branching index (g') equal to 1.0. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a crystallinity from 1 wt %, or 10 wt %, or 15 wt %, or 20 wt % to 25 wt %, or 30 wt %, or 35 wt %, or 40 wt % In an embodiment, the propylene-based interpolymer has a crystallinity from 10 to 40 wt %, or 20 to 39 wt %. Crystallinity is measured via DSC method, as described below in the test methods section. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a heat of fusion ($H_f$) from 40 J/g, or 45 J/g, or 50 J/g, or 55 J/g, or 60 J/g to 70 J/g, or 75 J/g, or 80 J/g. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a density from 0.870 g/cc, or 0.875 g/cc, or 0.880 g/cc to 0.885 g/cc, or 0.890 g/cc. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a melting temperature, Tm, from 85° C., or 90° C., or 95° C., or 100° C. to 110° C., or 115° C., or 120° C. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a weight average molecular weight (Mw) from 20,000 g/mol, or 24,000 g/mol, or 30,000 g/mol to 40,000 g/mol, or 48,000 g/mol, or 50,000 g/mol. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

In an embodiment, the propylene-based interpolymer has a Mw/Mn from 2.0, or 2.5 to 3.5, or 4.0. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

1. B-Value

The term "B-value" is a measure of randomness and measures the distribution of the propylene and comonomer across the polymer chain of the propylene-based interpolymer. For a propylene/ethylene copolymer, the "B-value" is a measure of randomness and measures the distribution of the propylene and ethylene across the polymer chain of the propylene/ethylene copolymer. B-values range from 0 to 2. The higher the B-value, the more alternating the ethylene distribution in the copolymer. The lower the B-value, the more blocky or clustered the ethylene distribution in the propylene/ethylene copolymer.

In an embodiment, the propylene-based interpolymer has a B-value of less than 1.0, or less than 0.99, or less than 0.98, or less than 0.97. In an embodiment, the propylene-based interpolymer has a B-value from 0.90, or 0.92, or 0.93, or 0.94 to 0.95, or 0.96, or 0.97, or 0.98, or 0.99. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_4$, $C_5$, $C_6$ and $C_8$ α-olefins.

The B-value as described by Koenig (*Spectroscopy of Polymers* (2d ed. 1999) is calculated as follows. B is defined for a propylene/ethylene copolymer as:

$$B = \frac{f(EP + PE)}{2 \cdot F_E \cdot F_P}.$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2. The B-values can be calculated for other copolymers in an analogous manner by assignment of the respective copolymer diads. For example, calculation of the B-value for a propylene/1-octene copolymer uses the following equation:

$$B = \frac{f(OP + PO)}{2 \cdot F_O \cdot F_P}.$$

A propylene/ethylene interpolymer may comprise two or more embodiments disclosed herein. A propylene/ethylene copolymer may comprise two or more embodiments disclosed herein. A propylene/α-olefin interpolymer may comprise two or more embodiments disclosed herein. A propylene/α-olefin copolymer may comprise two or more embodiments disclosed herein.

2. Suitable Catalyst for the Propylene-based Interpolymer

In an embodiment, the propylene-based interpolymer, further a propylene/ethylene interpolymer, further a propylene/ethylene copolymer, and further a PBPE, is made with a (i) catalyst that is a Group IV metal complex of a polyvalent aryloxyether, (ii) an activator, and/or (iii) a cocatalyst. The catalyst is capable of producing polymers from propylene containing monomer mixtures having extremely high molecular weight and isotacticity, at catalyst efficiencies of greater than 0.5 $g_{polymer}/\mu g_{metal}$, allowing the use of a chain transfer agent to control molecular weight without sacrificing molecular weight distribution. A sufficient quantity of chain transfer agent is used so that a substantial decrease in molecular weight (>30 percent) occurs compared to a comparative polymerization without the use of chain transfer agent. When the chain transfer agent is hydrogen, at least 0.01 mol percent (based on propylene) is used, and a maximum of 2 mole percent is used. Highly isotactic polymers can be prepared with high levels of chain transfer agents, while still affording narrow molecular weight distribution polymers and using low levels of alumoxane activators. Generally, use of high levels of chain transfer agent with more conventional catalysts results in production of polymers having broadened molecular weight distributions. Nonlimiting examples of suitable Group IV metals include titanium, zirconium, and hafnium.

The catalyst of Group IV metal complex of a polyvalent aryloxyether imparts unique properties to the propylene-based interpolymer, and further the PBPE, as described herein.

In an embodiment, the propylene-based interpolymer, further a propylene/ethylene interpolymer, further a propylene/ethylene copolymer, and further a PBPE, is characterized as having substantially isotactic propylene sequences. "Substantially isotactic propylene sequences" are sequences having an isotactic triad (mm) measured by $^{13}$C NMR of greater than 0.85, or greater than 0.90, or greater than 0.92, or greater than 0.93. Isotactic triads refer to the isotactic sequence in terms of a triad unit in the copolymer molecular chain determined by $^{13}$C NMR spectroscopy. In an embodiment, the Group IV metal complex is a hafnium-based polyvalent aryloxyether.

Nonlimiting examples of suitable Group IV metal complex of a polyvalent aryloxyether include [[2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)] dimethyl hafnium; and [[2',2'''-[1,3-propanediylbis(oxy-κO)]bis-{3-[9H-3,6-di-(1,1-dimethylethyl)-carbazol-9-yl]}-

5'-fluoro-5-(1,1,3,3-tetramethylbutyl)-[1,1'-biphenyl]-2-olato-κO]](2-)]dimethyl hafnium. The metal complexes are activated in various ways to yield catalyst compounds having a vacant coordination site that will coordinate, insert, and polymerize addition polymerizable monomers, especially olefin(s). For the purposes of this patent specification and appended claims, an "activator" or "cocatalyst" is any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

In an embodiment, catalyst activation may involve formation of a cationic, partially cationic, or zwitterionic species, by proton transfer, oxidation, or other suitable activation process. The present disclosure is operable and fully enabled regardless of whether or not such an identifiable cationic, partially cationic, or zwitterionic species actually results during the activation process, also known as an "ionization" process or "ionic activation process."

Ionizing cocatalysts may contain an active proton, or some other cation associated with, but not coordinated to or only loosely coordinated to, an anion of the ionizing compound. Nonlimiting examples include ammonium cation containing salts, especially those containing trihydrocarbyl-substituted ammonium cations containing one or two $C_{10-40}$alkyl groups, especially methylbis(octadecyl)-ammonium- and methylbis(tetradecyl)-ammonium-cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo Nobel under the trade name Armeen™ M2HT. In an embodiment, the ammonium salt activator is methyl di($C_{14-20}$ alkyl)ammonium tetrakis(pentafluorophenyl)borate.

Another suitable class of organometallic activators or cocatalysts is alumoxanes, also referred to as alkylaluminoxanes. Alumoxanes are well known activators for use with metallocene type catalyst compounds to prepare addition polymerization catalysts. Nonlimiting examples include alumoxanes that are Lewis acid modified alumoxanes, especially tri($C_{3-6}$)alkylaluminum modified methylalumoxane, including tri(isobutyl)aluminum modified methalumoxane, available commercially as MMAO-3A, from Akzo Nobel, or tri(n-octyl)aluminum modified methalumoxane, available commercially as MMAO-12, from Akzo Nobel. Combinations of activators are also contemplated by the present disclosure, for example, alumoxanes and ionizing activators in combination.

Within the scope of this disclosure is the use of alumoxane(s) or modified alumoxane(s) as an activator or as a tertiary component. That is, the compound may be used alone or in combination with other activators, either neutral or ionic, such as tri(alkyl)ammonium tetrakis(pentafluorophenyl)borate compounds, tris(perfluoroaryl) compounds, polyhalogenated heteroborane anions, and combinations of two or more of these materials. In this embodiment, the alumoxane may not contribute significantly to actual catalyst activation. Notwithstanding the foregoing, some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum-, or halogenated tri(hydrocarbyl)boron-modified alumoxanes, having from 1 to 10 carbons in each hydrocarbyl or halogenated hydrocarbyl group. Nonlimiting examples of suitable Lewis acid-modified alumoxane compounds are tri(i-butyl)aluminum-modified methalumoxane and tri(n-octyl)aluminum modified methalumoxane containing from 10 to 30, or 15 to 25 mole percent i-butyl content and 10 to 20, or 12 to 18 mole percent n-octyl content, respectively, the molar percents based on total alkyl ligand content. In an embodiment, the alumoxane or Lewis acid-modified alumoxane activator is utilized in molar ratios of cocatalyst: catalyst is from 20 to 200:1, or from 20 to 150:1, or from 20 to 80:1.

Because of the ability to be activated at relatively low levels of alumoxane or Lewis acid-modified alumoxane cocatalysts while maintaining high catalyst efficiency, the present Group IV metal complexes can achieve reduced levels of cocatalyst by-products in the resulting polymer. This in turn allows the polymers to be employed in demanding applications such as those requiring high clarity or low dielectric constant.

3. Propylene-Based Plastomer or Elastomer (PBPE)

In an embodiment, the propylene-based interpolymer is a propylene-based plastomer or elastomer. A "propylene-based plastomer or elastomer" (or "PBPE") is a propylene/ethylene copolymer and includes at least 50 weight percent of units derived from propylene and up to 10 wt % ethylene comonomer. In an embodiment, PBPE includes from 1 wt %, or 3 wt %, or 4 wt %, or 5 wt % to 7 wt %, or 8 wt %, or 9 wt %, or 10 wt % ethylene comonomer. In an embodiment, the PBPE includes from 50 wt %, or 60 wt %, or 70 wt %, or 80 wt %, or 90 wt %, or 91 wt %, or 92 wt %, or 93 wt % to 95 wt %, or 96 wt %, or 97 wt %, or 98 wt %, or 99 wt % propylene comonomer. In an embodiment, the PBPE includes greater than 50 wt % propylene comonomer.

In an embodiment, the PBPE has a total unsaturation per mole of propylene from 0.01%, or 0.015% to 0.025%, or 0.03%. The total unsaturation per mole of propylene is measured by $^1$H NMR analysis, as described below in the test methods section.

The PBPE melt flow rate is too high to be measured. In an embodiment, the melt viscosity, at 177° C., for the PBPE is from 500 mPa·s, or 750 mPa·s, or 1,000 mPa·s, or 2,000 mPa·s, or 3,000 mPa·s, or 5,000 mPa·s, or 8,000 mPa·s, or 9,000 mPa·s, or 10,000 mPa·s to 11,000 mPa·s, or 12,000 mPa·s, or 15,000 mPa·s, or 18,000 mPa·s, or 20,000 mPa·s, or 25,000 mPa·s, or 30,000 mPa·s, or 35,000 mPa·s, or 40,000 mPa·s, or 45,000 mPa·s, or 50,000 mPa·s. In an embodiment, the PBPE has a melt viscosity, at 177° C., from 500 mPa·s to less than, or equal to, 50,000 mPa·s, or from 800 mPa·s to 11,000 mPa·s. In an embodiment, the PBPE has a density from 0.870 g/cc, or 0.875 g/cc, or 0.880 g/cc, to 0.885 g/cc, or 0.890 g/cc.

In an embodiment, the PBPE has a crystallinity from 1 wt %, or 10 wt %, or 15 wt %, or 20 wt % to 25 wt %, or 30 wt %, or 35 wt %, or 40 wt % In an embodiment, a PBPE that is propylene/ethylene copolymer may have a crystallinity from 10 to 40 wt %, or 20 to 39 wt %. Crystallinity is measured via DSC method, as described below in the test methods section. The propylene/ethylene copolymer includes units derived from propylene and polymeric units derived from ethylene comonomer, and optionally units derived from a $C_4$-$C_{10}$ α-olefin. Nonlimiting examples of suitable comonomers include $C_2$, and $C_4$ to $C_{10}$ α-olefins; for example, $C_2$, $C_4$, $C_6$ and $C_8$ α-olefins.

In an embodiment, the PBPE has a heat of fusion ($H_f$) from 40 J/g, or 45 J/g, or 50 J/g, or 55 J/g, or 60 J/g to 70 J/g, or 75 J/g, or 80 J/g. In an embodiment, the PBPE has a melting temperature, Tm, from 85° C., or 90° C., or 95° C., or 100° C. to 110° C., or 115° C., or 120° C.

In an embodiment, the PBPE has a weight average molecular weight (Mw) from 20,000 g/mol, or 24,000 g/mol, or 30,000 g/mol to 40,000 g/mol, or 48,000 g/mol, or 50,000 g/mol. In an embodiment, the PBPE has a Mw/Mn from 2.0, or 2.5 to 3.5, or 4.0. In an embodiment, the PBPE has a branching index (g') from 0.95, or 0.99 to 1.0, or 1.01, or 1.05. In an embodiment, the PBPE has a branching index (g') equal to 1.0.

In an embodiment, the PBPE has a Koenig B-value of less than 1.0, or less than 0.99, or less than 0.98, or less than 0.97. The lower the B-value, the more blocky or clustered the ethylene distribution in a PBPE propylene/ethylene copolymer. For PBPE polymers made with a Group IV metal complex of a polyvalent aryloxyether catalyst, the B-values are less than 1.0. In an embodiment, the PBPE has a B-value from 0.90, or 0.92, or 0.93, or 0.94 to 0.95, or 0.96, or 0.97, or 0.98, or 0.99. Thus, for PBPE made with the Group IV metal complex of a polyvalent aryloxyether catalyst, not only is the propylene block length relatively long for a given percentage of ethylene, but a substantial amount of long sequences of three or more sequential ethylene insertions are present in the PBPE.

In an embodiment, the propylene-based interpolymer, further a propylene/ethylene interpolymer, further a propylene/ethylene copolymer, and further a PBPE has one, some, or all of the following properties: (i) at least 50 wt % units derived from propylene; (ii) a Koenig B-value of less than 1.0; (iii) a total mol % unsaturation propylene from 0.01% to 0.03%; (iv) density from 0.855 g/cc to 0.890 g/cc; (v) a melt viscosity, at 177° C., from 500 mPa·s to 50,000 mPa·s, or from 800 mPa·s to 11,000 mPa·s; (vi) a crystallinity from 1 wt % to 40 wt %; (vii) a Mw from 20,000 to 50,000 g/mol; (viii) a Mw/Mn from 2.0 to 4.0; (ix) a branching index (g') from 0.95 to 1.00, or equal to 1.0; and/or (x) sequences having an isotactic triad (mm) measured by $^{13}C$ NMR of greater than 0.85. In a further embodiment, the propylene-based interpolymer, further a propylene/ethylene interpolymer, further a propylene/ethylene copolymer, and further a PBPE has all of the above properties (i)-(x).

In an embodiment, the propylene-based interpolymer is a PBPE having one, some, or all of the following properties: (i) at least 50 wt % units derived from propylene and from 1 wt %, or 5 wt % to 7 wt %, or 10 wt % units derived from ethylene; (ii) a Koenig B-value of less than 1.0; (iii) a total mol % unsaturation propylene from 0.01% to 0.03%; (iv) a density from 0.875 g/cc, or 0.880 g/cc to 0.890 g/cc; (v) a melt viscosity, at 177° C., from 800 mPa·s to 11,000 mPa·s; (vi) a crystallinity from 15 wt % to 40 wt %; (vii) an Mw from 20,000 to 50,000 g/mol; (viii) a Mw/Mn from 2.0 to 3.5; (ix) a branching index (g') equal to 1.0; and/or (x) sequences having an isotactic triad (mm) measured by $^{13}C$ NMR of greater than 0.85. In a further embodiment, the PBPE has all of the above properties (i)-(x).

In an embodiment, the propylene-based interpolymer, and further a PBPE, is present in the composition in an amount from 45 wt %, or 50 wt %, or 55 wt %, or 60 wt %, or 65 wt %, or 69 wt % to 70 wt %, or 71 wt %, or 75 wt %, or 80 wt %, or 85 wt %, or 90 wt %, based on total weight of the composition.

A propylene-based interpolymer may comprise two or more embodiments disclosed herein. A PBPE may comprise two or more embodiments disclosed herein.

C. Ethylene-based Polymer

In an embodiment, the present composition includes an ethylene-based polymer. The ethylene-based polymer comprises a majority amount of units derived from ethylene, based on the weight of the ethylene-based polymer. In an embodiment, the ethylene-based polymer includes greater than 50 wt % units derived from ethylene, based on the weight of the ethylene-based polymer. In an embodiment, the ethylene-based polymer includes from 50 wt %, or 60 wt %, or 70 wt % to 75 wt %, or 80 wt %, or 90 wt %, or 95 wt %, or 99 wt %, or 100 wt % units derived from ethylene, based on the weight of the ethylene-based polymer.

In an embodiment, the ethylene-based polymer is selected from a high density, low molecular weight polyethylene wax, a by-product polyethylene wax, a Fischer-Tropsch wax containing an ethylene-based polymer, oxidized Fischer-Tropsch waxes containing an ethylene-based polymer, functionalized polyethylene waxes, and combinations thereof. In an embodiment, the ethylene-based polymer is not functionalized. In an embodiment, the ethylene-based polymer is a Fischer-Tropsch wax containing an ethylene-based polymer. Nonlimiting examples of Fischer-Tropsch waxes containing ethylene-based polymer include SASOL™ waxes such as SASOLWAX™ H1, available from the Sasol Wax Company.

In an embodiment, the ethylene-based polymer has a density from 0.880 g/cc, or 0.885 g/cc, or 0.890 g/cc, or 0.895 g/cc, or 0.900 g/cc, or 0.910 g/cc to 0.915 g/cc, or 0.920 g/cc, or 0.925 g/cc, or 0.930 g/cc, or 0.935 g/cc, or 0.940 g/cc, or 0.950 g/cc.

In an embodiment, the ethylene-based polymer has a melt viscosity, at 135° C., from 1 mPa·s, or 2 mPa·s, or 3 mPa·s, or 4 mPa·s, or 5 mPa·s, or 6 mPa·s, or 7 mPa·s, or 8 mPa·s, or 20 mPa·s, or 50 mPa·s, or 75 mPa·s, or 100 mPa·s, or 200 mPa·s, or 300 mPa·s, or 400 mPa·s to 500 mPa·s, or 750 mPa·s, or 1,000 mPa·s, or 1,500 mPa·s, or 2,000 mPa·s. In an embodiment, the ethylene-based polymer has a melt viscosity, at 135° C., from 1 mPa·s, or 2 mPa·s, or 3 mPa·s, or 4 mPa·s, or 5 mPa·s, or 6 mPa·s, or 7 mPa·s, or 8 mPa·s to 10 mPa·s, or 20 mPa·s, or 30 mPa·s, or 40 mPa·s, or 50 mPa·s.

In an embodiment, the ethylene-based polymer has a weight average molecular weight (Mw) from 600 g/mol, or 700 g/mol, or 750 g/mol, or 800 g/mol, or 850 g/mol, or 900 g/mol, or 1,000 g/mol, or 1,500 g/mol, or 2,000 g/mol, or 2,500 g/mol, or 3,000 g/mol to 50,000 g/mol, or 40,000 g/mol, or 30,000 g/mol, or 20,000 g/mol, or 15,000 g/mol, or 10,000 g/mol.

In an embodiment, the ethylene-based polymer has an acid value from 0 mg KOH/g, or 0.01 mg KOH/g to 0.1 mg KOH/g, or 0.2 mg KOH/g, as measured in accordance with ASTM D 1386/7.

In an embodiment, the ethylene-based polymer has one, some, or all of the following properties: (i) at least 50 wt % units derived from ethylene; (ii) a density from 0.880 g/cc to 0.950 g/cc; (iii) a melt viscosity at 135° C. from 1 mPa·s to 2,000 mPa·s, or from 1 mPa·s to 100 mPa·s; (iv) a Mw from 600 g/mol to 3,000 g/mol; and/or (v) an acid value from 0 mg KOH/g to 0.2 mg KOH/g. In a further embodiment, the ethylene-based polymer has all of the above properties (i)-(v).

In an embodiment, the ethylene-based polymer is present in the composition in an amount from 1 wt %, or 2 wt %, or 3 wt %, or 4 wt %, or 5 wt % to 10 wt %, or 15 wt %, or 20 wt %, or 25 wt %, or 30 wt %, based on total weight of the composition. In an embodiment, the ethylene-based polymer is present in the composition in an amount from 15 wt %, or 17 wt %, or 18 wt % to 20 wt %, or 25 wt %, or 30 wt %, based on total weight of the composition.

The ethylene-based polymer may comprise two or more embodiments disclosed herein.

D. Tackifier

The present composition optionally includes a tackifier. The tackifier has a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C., or 100° C. to 130° C., or 150° C., and will typically have a melt viscosity, at 190° C., as measured using a Brookfield viscometer, of from 1 mPa·s, or 100 mPa·s, or 500 mPa·s to 1,000 mPa·s, or 1,500 mPa·s, or 2,000 mPa·s. They are also available with differing levels of hydrogenation, or saturation, which is another commonly used term. Nonlimiting examples of suitable tackifying resins include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of 140° C. Other nonlimiting examples of suitable tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment, the tackifying agent is free of groups with which the carboxylic acid-based moiety of the carboxylic-functionalized ethylene/α-olefin interpolymer will react.

In an embodiment, the tackifying agent is a rosin-based tackifier selected from a partially hydrogenated glycerol ester, a fully hydrogenated pentaerythritol ester, a fully hydrogenated glycerol ester, anon-hydrogenated ester with a glass transition temperature (Tg) from 30° C., or 35° C., or 40° C. to 45° C. or 50° C., and combinations thereof.

In an embodiment, the tackifier is an aliphatic hydrogenated hydrocarbon resin. In a further embodiment, the aliphatic hydrogenated hydrocarbon tackifier is a hydrogenated cyclopentadiene-based tackifier. In a further embodiment, the aliphatic hydrogenated hydrocarbon tackifier is a hydrogenated cyclopentadiene-based tackifier with a ring and ball softening point of 115° C. and a melt viscosity at 190° C. of 400 mPa·s, available commercially under the trade name Eastotac™ H115R (available from Eastman Chemical).

The tackifier is present in the composition in an amount from 1 wt %, or 5 wt %, or 9 wt %, or 10 wt %, or 15 wt %, or 19 wt % to 20 wt %, or 21 wt %, or 23 wt %, or 25 wt %, or 28 wt %, or 30 wt %, based on the total weight of the composition.

E. Additives

The present composition may include one or more additives. Nonlimiting examples of suitable additives include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, and water.

In an embodiment, the composition includes an antioxidant. The antioxidant protects the composition from degradation caused by reaction with oxygen induced by such things as heat, light, or residual catalyst from the raw materials such as the tackifying resin. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3(3,5-d i-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-d tert-butyl-4-hydroxy-phenyl)-propionate].

Such antioxidants are commercially available from Ciba Specialty Chemicals and include Irganox™ 565, 1010, 1076 and 1726, which are hindered phenols. These are primary antioxidants act as radical scavengers and may be used alone or in combination with other antioxidants such as phosphite antioxidants like Irgafos™ 168, available from Ciba Specialty Chemicals. Phosphite catalysts are considered secondary catalysts and are not generally used alone. These are primarily used as peroxide decomposers. Other available catalysts are Cyanox™ LTDP, available from Cytec Industries, and Ethanox™ 330, available from Albemarle Corp. Many such antioxidants are available either to be used alone or in combination with other such antioxidants.

In an embodiment, the composition contains from 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % additive, based on total weight of the composition.

F. Composition

In an embodiment, the composition is an adhesive composition, and further a hot melt adhesive (HMA) composition, which includes: (A) from 1 wt % to 10 wt % carboxylic-functionalized ethylene/α-olefin interpolymer; (B) from 45 wt % to 90 wt % propylene-based polymer (for example, a PBPE); (C) from 1 wt % to 30 wt % ethylene-based polymer; (D) from 1 wt % to 30 wt % tackifier; and (E) from 0.1 wt % to 1.0 wt % antioxidant; wherein the combined amount of (A) carboxylic-functionalized ethylene/α-olefin interpolymer and (B) propylene-based interpolymer equals at least 50 wt % of the composition, and the composition has one, some, or all of the following properties: (i) a melt viscosity at 177° C. from 300 mPa·s to 4,000 mPa·s, or 5,000 mPa·s; (ii) a fiber tear greater than 50% at a temperature from −40° C. to 60° C.; (iii) a heat stress greater than 55° C., or greater than 80° C.; (iv) a peel adhesion failure temperature (PAFT) of from 50° C. to 80° C., or from 60° C. to 80° C., or greater than or equal to 60° C., or greater than or equal to 65° C.; (v) a set time of less than or equal to 5 seconds; and/or (vi) a low crystallization temperature peak ($T_{c1}$) greater than 50° C. and a high crystallization temperature peak ($T_{c2}$) greater than 95° C.

The carboxylic-functionalized ethylene/α-olefin interpolymer, propylene-based polymer, PBPE, ethylene-based polymer, tackifier, and antioxidant may be any respective carboxylic-functionalized ethylene/α-olefin interpolymer, propylene-based polymer, ethylene-based polymer, tackifier and antioxidant disclosed herein.

In an embodiment, the composition is an adhesive composition, and further a hot melt adhesive (HMA) composition, which includes: (A) a carboxylic-functionalized ethylene/α-olefin interpolymer having (i) a density from 0.855 g/cc to 0.895 g/cc and (ii) a melt viscosity at 177° C. less than or equal to 50,000 mPa·s, or from 2,000 mPa·s to 50,000 mPa·s; and (B) a propylene-based interpolymer (for example, a PBPE containing up to 10 wt % units derived from ethylene) having (i) a density from 0.870 g/cc to 0.890 g/cc and (ii) a melt viscosity at 177° C. less than or equal to 50,000 mPa·s, or from 500 mPa·s to 50,000 mPa·s. In an embodiment, the composition further includes (C) an ethylene-based polymer having (i) a density from 0.880 g/cc to 0/950 g/cc and (ii) a melt viscosity at 135° C. from 1 mPa·s to 2,000 mPa·s. In an embodiment, the composition further includes (D) a tackifier and/or (E) an antioxidant.

In an embodiment, the composition is an adhesive composition, and further a hot melt adhesive (HMA) composition, which includes: (A) from 1 wt %, or 5 wt % to 10 wt % MAH-g-ethylene/α-olefin interpolymer; (B) from 45 wt % to 90 wt % PBPE; (C) from 1 wt % to 25 wt %, or 30 wt % ethylene-based polymer; (D) from 1 wt % to 25 wt %, or 30 wt % tackifier; and (E) from 0.1 wt % to 1.0 wt % antioxidant; and the composition has one, some, or all of the following properties: (i) a melt viscosity at 177° C. from 300 mPa·s to 4,000 mPa·s, or 5,000 mPa·s; (ii) a fiber tear greater than 50% at a temperature from −40° C. to 60° C.; (iii) a heat stress greater than 80° C.; (iv) a peel adhesion failure temperature (PAFT) of from 60° C. to 80° C., or greater than or equal to 60° C., or greater than or equal to 65° C.; (v) a set time of less than or equal to 5 seconds; and/or (vi) a low crystallization temperature peak ($T_{c1}$) greater than 50° C. and a high crystallization temperature peak ($T_{c2}$) greater than 95° C. In a further embodiment, the composition has all of the above properties (i)-(vi). In a further embodiment, the MAH-g-ethylene/α-olefin interpolymer has a density from 0.855 g/cc to 0.885 c/cc and a melt viscosity at 177° C. from 5,000 mPa·s to 50,000 mPa·s. In a further embodiment, the PBPE contains from 5 wt % to 7 wt % units derived from ethylene, and the PBPE has a density from 0.880 g/cc to 0.890 g/cc and a melt viscosity at 177° C. from 800 mPa·s to 11,000 mPa·s. In a further embodiment, the ethylene-based polymer has a density from 0.890 g/cc to 0.910 g/cc and a melt viscosity at 135° C. from 1 mPa·s to 100 mPa·s.

In an embodiment, the combined amount of (A) carboxylic-functionalized ethylene/α-olefin interpolymer and (B) propylene-based interpolymer equals at least 50 wt %, based on the total weight of the composition. In an embodiment, the combined amount of (A) carboxylic-functionalized ethylene/α-olefin interpolymer and (B) propylene-based interpolymer equals from 51 wt %, or 55 wt % to 60 wt %, or 65 wt %, or 70 wt %, or 75 wt %, or 80 wt %, or 85 wt %, or 90 wt %, or 95 wt %, or 100 wt %, based on the total weight of the composition.

In an embodiment, the composition has a melt viscosity, at 177° C., from 300 mPa·s, or 350 mPa·s, or 400 mPa·s, or 500 mPa·s, or 600 mPa·s, or 700 mPa·s, or 800 mPa·s, or 850 mPa·s, or 900 mPa·s, or 1,000 mPa·s to 1,500 mPa·s, or 1,800 mPa·s, or 2,000 mPa·s, or 2,500 mPa·s, or 3,000 mPa·s, or 3,500 mPa·s, or 4,000 mPa·s, or 5,000 mPa·s.

In an embodiment, the composition has a fiber tear greater than 50%, or greater than 60%, or greater than 70%, or greater than 75%, or greater than 80%, or greater than 85%, or greater than 90% at a temperature from −40° C. to 60° C. In an embodiment, the composition has a heat stress greater than 55° C., or 60° C., or 65° C., or 70° C., or 75° C. to 80° C., or 85° C., or 90° C., or 95° C. In an embodiment, the composition has a heat stress from greater than 75° C. to 95° C. In an embodiment, the composition has a peel adhesion failure temperature (PAFT) of from 50° C., or 55° C., or 60° C., or 65° C. to 70° C., or 75° C., or 80° C. In an embodiment, the composition has a peel adhesion failure temperature (PAFT) greater than or equal to 60° C. In an embodiment, the composition has a set time of less than or equal to 5 seconds. In a further embodiment, the composition has a set time from 0.5 seconds, or 1.0 second, or 1.5 seconds, or 2.0 seconds to 3.0 seconds, or 3.5 seconds, or 4.0 seconds, or 4.5 seconds, or 4.9 seconds.

In an embodiment, the composition has a low crystallization temperature peak ($T_{c1}$) and a high crystallization temperature peak ($T_{c2}$). In an embodiment, the composition has a low crystallization temperature peak ($T_{c1}$) greater than 50° C., or from greater than 50° C., or 55° C. to 57° C., or 60° C., or 65° C., or 70° C., or 75° C., or 80° C., or 85° C., or 90° C. In an embodiment, the composition has a high crystallization temperature peak ($T_{c2}$) greater than 95° C., or from greater than 95° C., or 96° C. to 97° C., or 98° C., or 99° C., or 100° C.

In an embodiment, the composition has a melt viscosity, at 177° C., from 300 mPa·s to 4,000 mPa·s, or 5,000 mPa·s; a fiber tear greater than 50% at a temperature from −40° C. to 60° C.; a heat stress greater than 80° C.; a peel adhesion failure temperature (PAFT) of from 60° C. to 80° C.; and/or a set time of less than or equal to 5 seconds.

In an embodiment, the combined amount of (A) carboxylic-functionalized ethylene/α-olefin interpolymer and (B) propylene-based interpolymer equals at least 50 wt %, based on the total weight of the composition, and the composition has a melt viscosity, at 177° C., from 300 mPa·s to 4,000 mPa·s, or 5,000 mPa·s; a fiber tear greater than 50% at a temperature from −40° C. to 60° C.; a heat stress greater than 80° C.; a peel adhesion failure temperature (PAFT) from 60° C. to 80° C.; and/or a set time of less than or equal to 5 seconds.

The composition may comprise two or more embodiments disclosed herein.

G. Article

The present disclosure provides an article. The article includes at least one component formed from the present composition. The composition can be any composition as disclosed above. In an embodiment, the composition is an HMA composition. Nonlimiting examples of suitable articles include HMA bonded cardboard packaging boxes, multilayer articles, wood articles and non-woven articles. In an embodiment, that article includes a substrate. The composition is on at least one surface of the substrate. Nonlimiting examples of suitable substrates include film, sheets, fabric, cardboard and wood. In an embodiment, the composition forms a seal between the at least one surface of the substrate and at least one surface of another substrate.

The present article may comprise two or more embodiments disclosed herein.

Test Methods

Density is measured in accordance with ASTM D792, Method B. The result is recorded in grams (g) per cubic centimeter (g/cc or g/cm$^3$).

Acid value (or acid number) is measured in accordance with ASTM D 1386/7. Acid value is a measure of the amount of unreacted fatty acid present in the final composition. The acid value is the number of milligrams of potassium hydroxide required for the neutralization of free fatty acids present in one gram of a substance (e.g., the ethylene-based polymer). Units for acid value are mg KOH/g.

Ring-and-ball softening point is measured using a Mettler Toledo FP900 Thermosystem according to ASTM E28.

Melt viscosity was measured using a Brookfield Viscometer Model, and a Brookfield RV-DV-II-Pro viscometer spindle 31, at 177° C. for the PBPE, at 177° C. for the composition, and at 135° C. for the ethylene-based polymer. The sample was poured into the chamber, which was, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) was heated to the required temperature until the melted sample was one inch below the top of the sample chamber. The viscometer apparatus was lowered, and the spindle submerged into the sample chamber. Lowering was continued, until the brackets on the viscometer align on the Thermosel. The viscometer was turned on, and set to operate at a shear rate, which leads to a torque reading in the range of 40 to 60 percent of the total torque capacity, based on the rpm output of the viscometer. Readings were taken every minute for 15 minutes, or until the values stabilize, at which point, a final reading was recorded.

Heat stress resistance (heat stress) was measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction) having dimensions of 2 inches (50.8 mm)×3 3/16 in (81 mm) and 2 in (50.8 mm)×5 1/2 in (139.7 mm) were bonded by applying 0.000141b/in of the composition with an Olinger Bond Tester. The composition was applied perpendicular to the flutes in the center of the shorter coupon and the coupons were bonded such that the composition was 3/4 in (19 mm) from one end of the long coupon. Five replicates were made for each formulation. Samples were loaded into the sample holder with the short coupon end aligned with the edge of the sample holder. The samples were held in place with the wide plate secured by wingnuts. A 200 g weight was placed 3.94 in (100 mm) from the bond. The weight was secured by placing the peg on the weight into a hole made in the long coupon. The sample holder was then placed into a convection oven at a set temperature for 24 hours. If at least 80% of the bonds do not fail, then the sample is considered to have passed heat resistance testing at the test temperature. The oven temperature was varied until the maximum passing heat stress resistance was determined. All new bonded coupon samples were used for each test temperature. Results are reported as heat stress temperature (° C.).

Fiber Tear (%) Percent fiber tear (FT) of compositions using Inland corrugated cardboard was determined according to a standardized method. A bead of sample composition was applied on to a cardboard coupon (5×6 cm) using an Olinger Bond Tester, and a second coupon was quickly placed on top of the sample composition. Light finger pressure, for about 3 seconds, was applied to hold the bond in place. Samples were conditioned for at least 4 hours at room temperature and 50% relative humidity. Next, samples were conditioned at the test temperatures for 5 hrs. to 24 hrs. Samples (n=5) were pulled apart by hand and the failure mode (fiber tear, cohesive failure, adhesive failure) was recorded.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the Equation below:

% Crystallinity=(($H_f$)/292 J/g)×100.

The heat of fusion ($H_f$) and the peak melting temperature were reported from the second heat curve. Peak crystallization temperature was determined from the cooling curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, $T_c$, was determined from a DSC cooling curve as above except the tangent line was drawn on the high temperature side of the crystallization peak. Where this tangent intersects the baseline is the extrapolated onset of crystallization ($T_c$).

Glass transition temperature, $T_g$, was determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the $T_g$ region. The temperature at which the sample heat capacity was half-way between these baselines is the $T_g$.

Gel Permeation Chromatography (GPC) for Molecular Weight and Branching Index (g)

A high temperature gel permeation chromatography (GPC) system, equipped with Robotic Assistant Deliver (RAD) system was used for sample preparation and sample injection. The concentration detector was an Infra-red detector (IR-5) from Polymer Char Inc. (Valencia, Spain). Data collection was performed using a Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen-purged 1,2,4-trichlorobenzene (TCB) containing approximately 200 ppm 2,6-di-t-butyl-4-methylphenol (BHT). The flow rate was 1.0 mL/min, and the injection volume was 200 μl. A "2 mg/mL" sample concentration was prepared by dissolving the sample in $N_2$ purged and preheated TCB (containing 200 ppm BHT), for 2.5 hours at 160° C., with gentle agitation.

The GPC column set was calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N.Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad \text{(Eq 1)}$$

where $M_{PP}$ is PP equivalent MW, $M_{PS}$ is PS equivalent MW, log K and a values of Mark-Houwink coefficients for PP and PS are listed below.

| Polymer | a | log K |
| --- | --- | --- |
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\sum\limits_i Wf_i}{\sum\limits_i (Wf_i / M_i)}, \quad \text{(Eq 2)}$$

$$M_w = \frac{\sum\limits_i (Wf_i * M_i)}{\sum\limits_i (Wf_i)}, \quad \text{(Eq 3)}$$

where $Wf_i$ and $M_i$ are the weight fraction and molecular weight of elution component i, respectively.

The mass detector constant, laser light scattering detector constant and viscometer detector constant were determined using a standard reference (reference polymer is a linear polyethylene homopolymer) with a known value of weight average molecular weight (Mw=120,000 g/mol; dn/dc=−0.104 mL/g; MWD=2.9) and intrinsic viscosity (1.873 dL/g). The chromatographic concentrations were assumed low enough to eliminate addressing second Virial coefficient effects (concentration effects on molecular weight).

The Systematic Approach for the determination of detector offset was implemented in a manner consistent with that published by Balke & Mourey et. al. (Mourey & Balke, Chromatography Polym. Chpt 12, (1992)) (Balke, Thitiratsakul, Lew, Cheung & Mourey, Chromatography Polym. Chpt 13, (1992)), using data obtained from the two detectors, while analyzing a standard reference (a linear polyethylene homopolymer) with a known value of weight average molecular weight (Mw=120,000 g/mol; dn/dc=−0.104 mL/g; MWD=2.9) and intrinsic viscosity (1.873 dL/g) and narrow polystyrene standards. The Systematic Approach was used to optimize each detector offset to give molecular weight results as close as possible to those observed using the conventional GPC method.

The absolute weight average molecular weight Mw of the samples were characterized by the LS detector and IR-5 concentration detector using following equation:

$$Mw(\text{abs}) = K_{LS} * \frac{\sum (LS_i)}{\sum (IR_i)}, \quad \text{(Eq 4)}$$

where $\Sigma(LS_i)$ is the response area of the LS detector, $\Sigma(IR_i)$ is the response area of the IR-5 detector, and $K_{LS}$ is the instrument constant which was determined using the standard reference (a linear polyethylene homopolymer) with a known value of weight average molecular weight (Mw=120,000 g/mol; dn/dc=−0.104 mL/g; MWD=2.9), intrinsic viscosity (1.873 dL/g) and concentration.

The absolute molecular weight of each elution volume was calculated by following equation:

$$M_{LS,i} = K_{LS} * \frac{LS_i}{IR_i}. \quad \text{(Eq 5)}$$

The intrinsic viscosity of samples were characterized by a viscometer detector and IR-5 concentration detector using following equation:

$$IVw = K_{IV} * \frac{\sum (DV_i)}{\sum (IR_i)}, \quad \text{(Eq 6)}$$

where $\Sigma(DV_i)$ is the response area of the viscometer detector, $\Sigma(IR_i)$ is the response area of the IR-5 detector, and $K_{IV}$ is the instrument constant which was determined using the standard reference (a linear polyethylene homopolymer) with a known value of weight average molecular weight (Mw=120,000 g/mol; dn/dc=−0.104 mL/g; MWD=2.9), intrinsic viscosity (1.873 dL/g) and concentration.

The intrinsic viscosity of each elution volume was calculated by following equation:

$$IV_i = K_{IV} * \frac{DV_i}{IR_i}. \quad \text{(Eq 7)}$$

The $M_{LS,i}$ and $IV_i$ values of each elution fraction were used to generate the Mark-Houwink plot of sample.

The branching index (g') value of the elastomer was calculated by following equation: $g_i' = (IV_{Sample,i}/IV_{linear\ reference,i})$ (Eq. 8), where the $IV_{linear\ reference,i}$ is the intrinsic viscosity of a linear elastomer reference at the equivalent absolute molecular weight as the sample.

The linear elastomer reference was defined as an elastomer with "exactly" the same amount of comonomers as in the resin characterized. The Mark-Houwink plot of this linear elastomer reference is parallel to a linear polyethylene homopolymer in the detected MW range, and overlaps with the Mark-Houwink plot of the elastomer resin at low MW range-20,000 to 30,000 g/mol in this case. The elastomer molecular weight and intrinsic viscosity were "corrected" by following methods using a short chain branching (SCB) parameter:

$MW_{Elastomer}=(1+SCB\ wt\ \%)*MW_{Linear}$, while the $IV_{Elastomer}=IV_{Linear}(1+SCB\ wt\ \%)$. The weight fraction of SCB ("SCB wt %") and the SCB per 1000 carbon ("SCB/1000C") has the relationship as follows: SCB wt %=[(SCB/1000C*X*14)/14000], where X is the comonomer type—in this case, X=8 for octene and X=3 for propylene.

The SCB and SCB distribution along with MWD can be obtained by using the composition mode of detector IR-5. The "SCB wt %" used is an empirical value which could be consistent, but may not be exactly equal to the comonomer weight fractions in the elastomer, especially when there are multiple comonomers in the elastomer.

By introducing "SCB correction" on absolute molecular weight and intrinsic viscosity, the factor branching index (g') decrease, caused by comonomers, was eliminated. Based on the comonomer level in each elastomer sample, the "SCB correction" may be different. The main criteria of a "SCB correction" is overlaid well with a characterized elastomer sample at low MW fractions—which assumes there was no or very rare LCB. This was completed by adjusting the value of "SCB wt %" level.

$^{13}$C NMR Experimental Procedure for Propylene-ethylene Copolymers $^{13}$C NMR was used for ethylene content, Koenig B-value, triad distribution, and triad tacticity and is performed as follows:

Sample Preparation (Propylene-ethylene Copolymers)—The samples were prepared by adding approximately 2.7 g of a 50/50 mixture of tetrachloroethane-$d_2$/orthodichlorobenzene containing 0.025 M Cr(AcAc)$_3$ to 0.20-0.30 g sample in a Norell 1001-7 10 mm NMR tube. The samples were dissolved and homogenized by heating the tube and its contents to 150° C. using a heating block and heat gun. Each sample was visually inspected to ensure homogeneity.

Data Acquisition Parameters (Propylene-ethylene Copolymers)—The data was collected using a Bruker 400 MHz spectrometer equipped with a Bruker Dual DUL high-temperature CryoProbe. The data was acquired using 320 transients per data file, a 6 sec pulse repetition delay, 90 degree flip angles, and inverse gated decoupling with a sample temperature of 120° C. All measurements were made on non-spinning samples in locked mode. Samples were allowed to thermally equilibrate for 7 minutes prior to data acquisition. Percent mm tacticity and wt % ethylene was then determined according to methods commonly used in the art.*

*References: For composition (wt % E): S. Di Martino and M. Kelchtermans; J. Appl. Polym. Sci., V 56, 1781-1787 (1995); Tacticity, detailed assignments: V. Busico, R. Cipullo; Prog. Polym. Sci. V 26, 443-533 (2001).

The "Koenig B-value" or chi statistic is one measure of randomness or blockiness in a propylene ethylene random copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1−[E]. Jack L. Koenig, *Spectroscopy of Polymers* (2d ed. 1999).

$^1$H NMR Analysis—Total Unsaturation Per Mole Propylene

Samples were prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples were dissolved and homogenized by heating the tube and its contents to 110° C. The data was collected using a Bruker 400 MHz spectrometer equipped with a Bruker Dual DUL high-temperature CryoProbe. The unsaturation data was collected using 4 scans per data file, a 15.6 second pulse repetition delay with a sample temperature of 120° C. The acquisition was carried out using spectral width of 10,000 Hz and a file size of 16K data points. The presaturation experiment was run with a modified pulse sequence, lc1prf2.zz1 using 100 scans per data file. The following calculations were used:

Moles of H from propylene: Mol fraction propylene*(integral area δ 3.5-0.2 ppm)

Total moles propylene $$\frac{\text{moles } H \text{ from propylene}}{6 \text{ protons}}$$

Mol % Cis/Trans Unsaturation/mol propylene $$\frac{100 * \text{moles } cis/trans}{\text{Total moles propylene}}$$

Mol % vinylidene unsaturation/mol propylene $$\frac{100 * \text{moles vinylidene}}{\text{Total moles propylene}}$$

Total mol % unsaturation/mol propylene

Mol % vinyl + Mole *cis* & *trans* + Mol % *trisub* + Mol + vinylidene

Mol % vinyl unsaturation/mol propylene $$\frac{100 * \text{moles vinyl}}{\text{Total moles propylene}}$$

Mol % trisubtituted unsaturation/mol propylene $$\frac{100 * \text{moles } trisub}{\text{Total moles propylene}}$$

Peel Adhesion Failure Temperature (PAFT)

Peel adhesion failure temperature (PAFT) was tested according to ASTM D 4498 with a 100 gram weight in the peel mode. The tests were started at room temperature (25° C./77° F.) and the temperature was increased at an average rate of 0.5° C./minute.

Samples for PAFT testing were prepared using two sheets of 40 pound Kraft paper, each of 6×12 in (152×305 mm) dimensions. On the bottom sheet, lengthwise and separated by a gap of 1 in (25 mm), were adhered in parallel fashion two 1.75 in or 2 in (45 mm or 51 mm) wide strips of a one sided, pressure-sensitive tape such as masking tape. The composition sample to be tested was heated to 177° C. (350° F.) and drizzled in an even manner down the center of the gap formed between the tape strips. Then, before the composition can unduly thicken, two glass rods, one rod riding immediately upon the tapes and shimmed on each side of the gap with a strip of the same tape followed by the second rod and (between the two rods) the second sheet of paper, were slid down the length of the sheets. This was done in a fashion such that the first rod evenly spreads the composition in the gap between the tape strips and the second rod evenly compress the second sheet over the top of the gap and on top of the tape strips. Thus, a single 1 inch (25.4 mm) wide strip of sample composition was created between the two tape strips, and bonding the paper sheets. The sheets so bonded were cut crosswise into strips of width 1 inch (25.4 mm) and length of 3 inches (76.2 mm), each strip having a 1×1 in (25×25 mm) adhesive sample bond in the center. The strips were then be employed in the PAFT testing, as desired.

Open Time and Set Time

Set Time and Open Time properties were determined using the Olinger Bond Tester, a mechanical testing device used to form and tear test bonds. The Olinger Bond Tester was heated to 350° C. (177° C.). The bottom substrate, 2.5" (63.5 mm)×2" (50.8 mm) corrugated board, moved on a track under the adhesive pot which delivered a bead of polymer approximately ¹⁄₁₆" (1.6 mm) to ⅛" (3.2 mm) wide, and 1" (25.4 mm) long. The adhesive pot pressure was increased, or decreased, in order to maintain consistent bead size. A top substrate, 2.5" (63.5 mm)×2" (50.8 mm), was applied to the bottom substrate, with a pressure of 2 bars. The Olinger has 2 timers, capable of measuring set-time and open-time potential to the nearest second.

Open Time measurement—is the longest time period between adhesive application to one substrate, and the bonding with a second substrate, that results in a 75% fiber-tearing bond. For testing, compression time (or set time) was set to the time determined by set time measurement to achieve 100% fiber tear. Open time was set at 10 seconds and increased in 10 second intervals until less than 50% fiber tear was achieved. The open time was decreased by 5 sec and % fiber tear determined. Finally, open time was changed by 1 second interval to determine the maximum allowable time to achieve 75% or greater fiber tear.

Set Time measurement—is the minimum compression time required to achieve a fiber-tearing bond. For testing, open time was set at 2 seconds (sec). A bond was formed as the top substrate was compressed onto the bottom substrate. After a preset compression time, a tear test was executed as the top substrate was pulled from the bottom substrate. A visual assessment was then made to determine the percentage of fiber tear achieved under the preset test conditions. The set time was changed in one second intervals, determining the time to achieve 100% fiber tear and less than 75% fiber tear. The set time was recorded as the shortest time, to the nearest second, at which a minimum of 75% fiber tear was obtained.

Some embodiments of the present disclosure will now be described in detail in the following Examples.

EXAMPLES

1. Preparation of Propylene-based Interpolymer

A propylene-based interpolymer (for example, a PBPE) is produced utilizing Catalyst A, a hafnium metal complex of a polyvalent aryloxyether catalyst that is hafnium, [[2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl. Table 1 below provides the name and structure for Catalyst A.

TABLE 1

Catalyst A hafnium, [[2',2'''-[(1R,2R)-1,2-cylco-hexanediylbis(methyleneoxy-κO)]bis[3-(9H-carbazol-9-yl)-5-methyl[1,1'-biphenyl]-2-olato-κO]](2-)]dimethyl

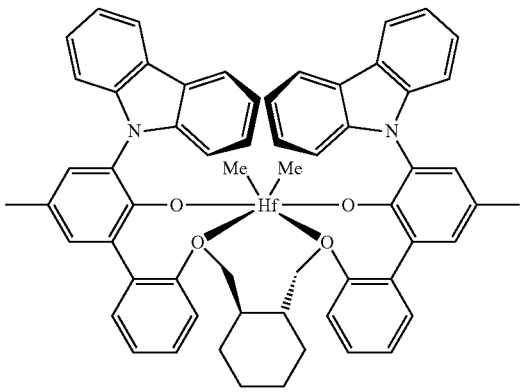

The PBPE is made according to the following procedure. Catalyst A and cocatalyst component solutions are metered using pumps and mass flow meters and are combined with the catalyst flush solvent and introduced into the bottom of the reactor. The cocatalyst used is a long-chain alkyl ammonium borate of approximate stoichiometry equal to methyl di(octadecyl)ammonium tetrakis(pentafluorophenyl)borate (MDB) combined with a tertiary component, tri(isobutyl) aluminum modified methalumoxane (MMAO) containing a molar ratio of i-butyl/methyl groups of 1/3. For Catalyst A, the cocatalyst is in a molar ratio based on Hf of 1.2/1, and MMAO (25/1 Al/Hf).

The polymerization process is exothermic. There are about 900 British thermal units (BTUs) are released per pound (2009 kJ/kg) of propylene polymerized and about 1,500 BTUs released per pound (3489 kJ/kg) of ethylene polymerized. The primary process design consideration is the removal of the heat of reaction. The propylene-ethylene (P-E) copolymers are produced in a low-pressure, solution polymerization loop reactor, made up of a 3 inch (76 mm) loop pipe plus two heat exchanges, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures.

The solvent used is a high purity iso-paraffinic fraction available from Exxon under the trademark Isopar E. Fresh propylene is passed through a bed of Selexsorb COS for purification before mixing with a recycle stream containing solvent, propylene, ethylene, and hydrogen. After mixing with the recycle stream, the combined stream is passed through a bed of 75 wt % Molecular Sieve 13X and 25 wt % Selexsorb CD for further purification before using a high pressure 700 psig (4826 kPa) feed pump to pass the contents to the reactor. Fresh ethylene is passed through a Selexsorb COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and the control temperature is reported in Table 1A. The propylene conversion in the reactor is maintained by controlling the catalyst injection rate. The reaction temperature is maintained by controlling the water temperature across the shell side of the heat exchanger at 85° C. The residence time in the reactor is short (10 minutes). The propylene conversion per reactor pass is also reported in Table 1A.

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer and act as stabilizers to prevent polymer degradation while in storage before subsequent fabrication at an end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene, are sent to a block flare and burned.

The process conditions for the PBPE produced by the foregoing process are provided in Table 1A below. The properties for the PBPE produced by the foregoing process are provided in Table 2 below.

TABLE 1A

Process Conditions for PBPE1

| | | | |
|---|---|---|---|
| Reactor Control Temp. (° C.) | 150 | Catalyst Flow (lb/hr) | 1.48 |
| Solvent (ISOPAR-E) Feed (lb/hr) | 779.02 | Catalyst Conc. (ppm) | 99.98 |
| Propylene Feed (lb/hr) (monomer) | 240.95 | Cocatalyst-1 Flow (lb/hr) | 1.66 |
| Ethylene Feed (lb/hr) (comonomer) | 15.59 | Cocatalyst-1 Conc. (ppm) | 1196.07 |
| Reactor Propylene Conversion (wt %) | 90.59 | Cocatalyst-2 Flow (lb/hr) | 0.75 |
| Hydrogen Feed (SCCM) | 4849.42 | Cocatalyst-2 Conc. (ppm) | 1196.07 |

TABLE 2

Properties for PBPE1

| | | | |
|---|---|---|---|
| wt % C$_2$ | 5.5 | Mn | 16,309 |
| wt % C$_3$ | 94.5 | Mw | 38,155 |
| Density | 0.885 | Mw/Mn | 2.34 |
| PBPE Viscosity at 177° C. (mPa · s) | 3,389 | B-Value | 0.92 |
| T$_m$ (° C.) | 104.1 | Total mol % unsat/mol propylene | 0.0164 |
| T$_c$ (° C.) | 67.25 | Isotacticty | |
| % Crystallinity | 32.7 | (% mm) | 94.8 |
| H$_f$ (J/g) | 50.4 | (% mr) | 2.8 |
| Branching Index (g') | 1.0 | (% rr) | 2.4 |

A. Isotacticty in Table 2 is Determined with $^{13}$C NMR—
The samples are prepared by adding approximately 2.6 g of a 50/50 mixture of tetrachloroethane-d2/orthodichlorobenzene that is 0.025M in chromium acetylacetonate (relaxation agent) to 0.2 g sample in a 10 mm NMR tube. The samples were dissolved and homogenized by heating the tube and its contents to 150° C. The data were collected using a Bruker 400 MHz spectrometer equipped with a Bruker Dual DUL high-temperature CryoProbe. The data was acquired using 160 scans per data file, a 6 second pulse repetition delay with a sample temperature of 120° C. The acquisition was carried out using spectral width of 25,000 Hz and a file size of 32K data points.

2. Production of Compositions

Materials used to produce compositions, further hot melt adhesive compositions are shown in Table 3 below. The starting materials from Table 3 are weighed and then blended at 177° C. for 30 min at 100 rpm, using a small bowl HAAKE blender. The compositions and their application performance data are provided in Table 4 below.

wt % of the composition (59.70 wt %), results in a fiber tear greater than 80% at a temperature from −40° C. to 60° C. and a set time of less than 5 seconds, while also maintaining a high heat stress performance (greater than 80° C.) and improving the PAFT to 60° C., or greater than 60° C. (67° C.).

Compositions containing a propylene-based polymer (Licocene™ PP 6102) (CS 1, CS 2) exhibit a set time of 11 seconds or more. In contrast, compositions containing a PBPE, an ethylene-based polymer (SASOLWAX H1), and carboxylic-functionalized ethylene/α-olefin interpolymer (AFFINITY™ GA 1000R) (Ex. 1) advantageously exhibit a set time of 5 seconds or less. A fast packaging line, which is typically in the range of sealing 30 to 50 boxes per minute, requires that the adhesive composition will set up quickly because the boxes are sealed at such a high speed. A set time of 5 seconds or less indicates that an adhesive composition is suitable for the fast speed of a packaging line. Not wishing to be bound by a particular theory, Applicant believes the addition of an ethylene-based polymer (SASOLWAX H1)

TABLE 3

Starting materials for compositions

| Component | Specification | Source |
|---|---|---|
| PBPE1 | See above, Table 2 | Dow |
| AFFINITY ™ GA 1000R (GA 1000R) | Maleic anhydride (MAH)-grafted ethylene/1-octene copolymer<br>density = 0.878 g/cc melting point (Tm) = 68.0° C.<br>Mw = >10,000 g/mol MAH content = <0.09 wt %<br>melt viscosity at 177° C. (Brookfield) = 13,000 mPa · s<br>glass transition temp (Tg) = −58.0° C. | The Dow Chemical Company |
| AFFINITY ™ GA 1900 (GA 1900) | Ethylene/1-octene copolymer<br>(non-functionalized ethylene/α-olefin copolymer)<br>density = 0.870 g/cc melting point (Tm) = 67.8° C.<br>melt viscosity at 177° C. (Brookfield) = 8,200 mPa · s<br>glass transition temp (Tg) = −57.8° C.<br>Mw = >10,000 g/mol | The Dow Chemical Company |
| SASOLWAX ™ H1 (FT H1) | Fischer-Tropsch (FT) wax containing an ethylene-based polymer<br>density = 0.90 g/cc (at 25° C.) drop point = 112° C.<br>melt viscosity at 135° C. (Brookfield) = 8 mPa · s<br>melting point (Tm) = >90° C.<br>Mw = 880 Dalton (880 g/mol)<br>acid value = <0.1 mg KOH/g | Sasol Wax Company |
| Licocene ™ PP 6102 (PP 6102) | Polypropylene wax<br>metallocene-catalyzed polypropylene wax, white fine grain<br>density = 0.90 g/cc (at 23° C.) drop point = 145° C.<br>melt viscosity at 170° C. (Brookfield) = 60 mPa · s<br>acid value = 0 mg KOH/g | Clariant |
| Eastotac ™ H115R (H115R) | Tackifier - hydrogenated hydrocarbon resin<br>density = 1.04 g/mL form = Flake<br>ring and ball softening point = 115° C.<br>melt viscosity at 190° C. (Brookfield) = 400 mPa · s<br>glass transition temp (Tg) = 53° C. (midpoint)<br>color, Gardner (ASTM D1544) = 1.5<br>color, Gardner (molten) (ASTM D1544) = 4<br>bromine number = 5 | Eastman |
| Irganox ®1010 (AO) | Antioxidant pentaerythritol tetrakis(3-(3,5-di-tert-butyl-4-hydroxyphenyl)propionate) (CAS 6683-19-8)<br>density = 1.15 g/cc flashpoint = 297° C. | BASF |

As shown in Table 4, compositions containing a PBPE and an ethylene-based polymer (SASOLWAX H1) without a carboxylic-functionalized ethylene/α-olefin interpolymer (CS 3) exhibit a fiber tear less than 50% at a temperature from −40° C. to 60° C. Surprisingly, the addition of carboxylic-functionalized ethylene/α-olefin interpolymer (AFFINITY™ GA 1000R) into a composition containing a PBPE and an ethylene-based polymer (SASOLWAX H1) (Ex. 1), wherein the combined amount of carboxylic-functionalized ethylene/α-olefin interpolymer and PBPE is greater than 50 decreased the set time of the composition because the ethylene-based polymer (SASOLWAX H1) introduced a high crystallization peak ($T_{c2}$), which is not present in compositions containing a propylene-based polymer (LICOCENE™ PP 6102).

A low polymer content composition containing a combined amount of non-functionalized ethylene/α-olefin interpolymer (AFFINITY™ GA 1000R) and PBPE of less than 40 wt % (CS 5) exhibits a PAFT of less than 60° C. In contrast, compositions containing a combined amount of carboxylic-functionalized ethylene/α-olefin interpolymer (AFFINITY™ GA 1000R) and PBPE of greater than 50 wt % (Ex. 1) advantageously exhibit a PAFT of greater than 60° C., and further a heat stress of greater than 80° C.

TABLE 4

| | Compositions* | | | | | |
|---|---|---|---|---|---|---|
| | CS 1 | CS 2 | CS 3 | CS 4 | CS 5 | Ex. 1 |
| GA 1000R | — | — | — | — | — | 9.95 |
| GA 1900 | — | — | — | 9.95 | 24.88 | — |
| PBPE 1 | 69.65 | 59.70 | 59.70 | 49.75 | 14.92 | 49.75 |
| FT H1 | — | — | 19.90 | 19.90 | 29.85 | 19.90 |
| PP 6102 | 9.95 | 19.90 | — | — | — | — |
| H115R | 19.90 | 19.90 | 19.90 | 19.90 | 29.85 | 19.90 |
| AO | 0.50 | 0.50 | 0.50 | 0.50 | 0.50 | 0.50 |
| Total | 100% | 100% | 100% | 100% | 100% | 100% |
| Set Time (sec) | 20 | 11 | 3 | 2 | 2 | 2 |
| 1$^{st}$ cool T$_{c1}$ (° C.) | 69.22 | 77.5 | 61.1 | 54.4 | N/A | 56.0 |
| 1$^{st}$ cool T$_{c2}$ (° C.) | N/A | N/A | 96.7 | 96.4 | 96.0 | 96.4 |
| Viscosity† @ 177° C. mPa · s | 1,748.6 | 1,217 | 760 | 886 | 394 | 874 |
| Heat Stress ° C. | — | 80 | 90 | 75 | 75 | 90 |
| PAFT ° C. | 74 | 76 | 45 | 44 | 59 | 67 |
| Fiber Tear −40° C. | 99 | 94 | 28 | 92 | 100 | 100 |
| −17° C. | 97 | 98 | 0 | 16 | 90 | 92 |
| −5° C. | 99 | 99 | 0 | 12 | 96 | 82 |
| 23° C. | 100 | 100 | 0 | 9 | 99 | 97 |
| 60° C. | 100 | 100 | 3 | 100 | 100 | 98 |

CS = Comparative Sample
*Table 4 values are weight percent, based on the total weight of the composition
†Viscosity of the composition It is specifically intended that the present disclosure not be limited to the embodiments and illustrations contained herein, but include modified forms of those embodiments including portions of the embodiments and combinations of elements of different embodiments as come within the scope of the following claims.

We claim:

1. A composition comprising:
   (A) a carboxylic-functionalized ethylene/α-olefin interpolymer having
      (i) a density from 0.855 g/cc to 0.895 g/cc; and
      (ii) a melt viscosity, at 177° C., less than, or equal to, 50,000 mPa·s; and
   (B) a propylene-based interpolymer having
      (i) a density from 0.870 g/cc to 0.890 g/cc;
      (ii) a melt viscosity, at 177° C., less than, or equal to, 50,000 mPa·s, and
      (iii) a Koenig B-value of less than 1.0.

2. The composition of claim 1 further comprising an ethylene-based polymer having
   (i) a density from 0.880 g/cc to 0.950 g/cc; and
   (ii) a melt viscosity, at 135° C., from 1 mPa·s to 2,000 mPa·s.

3. The composition of claim 1 further comprising a tackifier.

4. The composition of claim 1, wherein the composition is an adhesive composition.

5. The composition of claim 1, wherein the carboxylic-functionalized ethylene/α-olefin interpolymer has a density from 0.855 g/cc to 0.880 g/cc.

6. The composition of claim 1, wherein the carboxylic-functionalized ethylene/α-olefin interpolymer has a melt viscosity, at 177° C., from 2,000 mPa·s to 50,000 mPa·s.

7. The composition of claim 1, wherein the carboxylic-functionalized ethylene/α-olefin interpolymer is a maleic-anhydride-functionalized ethylene/α-olefin interpolymer.

8. The composition of claim 1, wherein the carboxylic-functionalized ethylene/α-olefin interpolymer is a maleic-anhydride-grafted ethylene/α-olefin copolymer.

9. The composition of claim 1, wherein the propylene-based interpolymer has a melt viscosity, at 177° C., from 800 mPa·s to 11,000 mPa·s.

10. An article comprising at least one component formed from the composition of claim 1.

11. The composition of claim 1, wherein the propylene-based interpolymer has a total unsaturation per mole of propylene from 0.01% to 0.03%.

12. The composition of claim 11, wherein the carboxylic-functionalized ethylene/α-olefin interpolymer is present in an amount from 1 weight percent (wt %) to 10 wt %, based on total weight of the composition.

13. The composition of claim 12, wherein the propylene-based interpolymer is a propylene-based plastomer or elastomer (PBPE) comprising from 1 wt % to 10 wt % ethylene comonomer.

14. The composition of claim 13, wherein the PBPE is present in an amount 45 wt % to 90 wt %, based on total weight of the composition.

15. The composition of claim 14, further comprising from 15 wt % to 30 wt % of an ethylene-based polymer, the ethylene-based polymer comprising from 70 wt % to 100 wt % units derived from ethylene, based on the weight of the ethylene-based polymer.

16. The composition of claim 15, further comprising from 5 wt % to 25 wt % of the tackifier, the tackifier having a ring and ball softening point from 100° C. to 130° C.

17. The composition of claim 16, wherein the composition has a melt viscosity, at 177° C., from 500 mPa·s to 1,500 mPa·s.

18. The composition of claim 17, having a set time from 0.5 seconds (s) to 4.9 s.

19. The composition of claim 18, having a peel adhesion failure temperature (PAFT) from 60° C. to 75° C.

20. The composition of claim 19, having a fiber tear greater than 90% at a temperature from −40° C. to 60° C.

* * * * *